United States Patent [19]

Shikata et al.

[11] Patent Number: 4,563,416
[45] Date of Patent: Jan. 7, 1986

[54] SOLID STATE TRACK DETECTOR COMPOSED OF COPOLYMER OF ALKYLENE GLYCOL BISALLYL CARBONATE AND MINOR AMOUNT OF HIGHER ALKYL ACRYLATE OR METHACRYLATE

[75] Inventors: Kazuo Shikata, Tokuyama; Yoshinori Mizumoto, Kudamatsu, both of Japan

[73] Assignee: Tokuyama Soda Kabushiki Kaisha, Yamaguchi, Japan

[21] Appl. No.: 655,532

[22] Filed: Sep. 28, 1984

[30] Foreign Application Priority Data

Sep. 30, 1983 [JP] Japan .................................. 58-180609

[51] Int. Cl.$^4$ .............................................. G03C 1/76
[52] U.S. Cl. ..................... 430/533; 430/523; 526/314
[58] Field of Search ................. 526/314; 430/523, 533

[56] References Cited

U.S. PATENT DOCUMENTS

| | | | |
|---|---|---|---|
| 2,384,117 | 9/1945 | Muskat et al. | 526/314 X |
| 2,910,456 | 10/1959 | Koch de Gooreyand et al. | 526/314 X |
| 3,503,942 | 3/1970 | Seiderman | 526/314 X |
| 4,260,564 | 4/1981 | Baiocchi et al. | 526/314 X |
| 4,360,653 | 11/1982 | Stevens et al. | 526/314 X |
| 4,368,310 | 1/1983 | Leatherman | 526/314 |

FOREIGN PATENT DOCUMENTS

| | | | |
|---|---|---|---|
| 0205267 | 11/1954 | Australia | 526/314 |
| 0071475 | 2/1983 | European Pat. Off. | 526/314 |
| 0061411 | 5/1981 | Japan | 526/314 |
| 0818471 | 8/1959 | United Kingdom | 526/314 |
| 2076836 | 12/1981 | United Kingdom | 526/314 |

OTHER PUBLICATIONS

Pang Deling et al., C.A. vol. 97, 1982, 152631 X.

Primary Examiner—John E. Kittle
Assistant Examiner—Mukund J. Shah
Attorney, Agent, or Firm—Sherman & Shalloway

[57] ABSTRACT

A solid state track detector composed of a crosslinked copolymer, said copolymer consisting essentially of
(A) units derived from an alkylene glycol bisallyl carbonate represented by the general formula

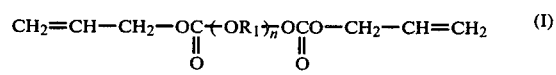

wherein $R_1$ represents an alkylene group having 2 to 6 carbon atoms, and n is an integer of from 1 to 6, and
(B) units derived from an alkyl acrylate or methacrylate represented by the general formula

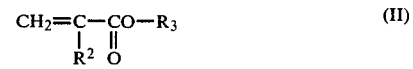

wherein $R_2$ represents a hydrogen atom or a methyl group and $R_3$ represents an unsubstituted or substituted alkyl group having 6 to 20 carbon atoms, the proportion of said units derived from the alkyl acrylate or methacrylate of formula (II) being 0.5 to 3 mole % based on the crosslinked copolymer.

8 Claims, No Drawings

SOLID STATE TRACK DETECTOR COMPOSED OF COPOLYMER OF ALKYLENE GLYCOL BISALLYL CARBONATE AND MINOR AMOUNT OF HIGHER ALKYL ACRYLATE OR METHACRYLATE

This invention relates to a solid state track detector. More specifically, this invention relates to a solid state track detector by which a latent image formed on its surface as a result of collision of elementary particles such as neutrons, alpha-rays and cosmic rays can be viewed as a clear developed image of etch pits by chemically etching its surface.

When a polymeric material is used in the solid state track detector (SSTD), scission of the molecular chains of the polymer occurs along the tracks of charged particles to form a latent image. When the SSTD exposed to the charged particles is, for example, chemically etched with an alkali, etc., the latent image is developed as etch pits. The existence, intensity, charge, etc. of the charged particles can be determined by microscopically observing the shape, size, depth, etc. of the etch pits and analyzing them.

Since SSTD undergoes very little formation of a background by ionizing radiations except by heavy charged particles and can withstand long-term storage, it can be utilized, for example, in experiments in nuclear physics and as a detector for heavy charged particles in cosmic rays.

Cellulose nitrate, polycarbonate, a homopolymer of diethylene glycol bisallyl carbonate (trade name CR-39), and a mixture of CR-39 with a small amount of dioctyl phthalate are typical examples of conventional polymeric materials for SSTD (see Physics Today, 1981, September, pages 32–39).

Among the above polymeric materials, polycarbonate is known to develop rough surfaces and irregular tracks during etching. It is also known that cellulose nitrate develops extremely rough surfaces and etch pits and suffers from the fading of latent image.

The homopolymer of diethylene glycol bisallyl carbonate is better than polycarbonate and cellulose nitrate as a material for SSTD and permits a good formation of etch pits. Chemical etching of this polymer, however, causes scission of the polymer chains. This leads to the defect that after the chemical etching, background holes irrelevant to the tracks of the charged particles are generated on the surface in addition to the etch pits. As a result of the formation of the background holes, the smoothness of the polymer surface is lost and the light reflects diffusedly. This causes a reduction in transparency or transmission, and makes it difficult to perceive the etch pits.

The above-cited Physics Today discloses that the mixture of diethylene glycol bisallyl carbonate homopolymer and a small amount of dioctyl phthalate has greatly improved post-etch optical properties suitable for SSTD.

It is an object of this invention to provide a solid state track detector capable of detecting the tracks of neutrons, charged particles, etc. with good sensitivity.

Another object of this invention is to provide a solid state track detector which does not lose its surface smoothness as a result of the formation of background holes by a chemical etching treatment.

Still another object of this invention is to provide an alkylene glycol bisallyl carbonate copolymer having a specified copolymer composition as a material for achieving the aforesaid objects.

Further objects and advantages of this invention will become apparent from the following description.

According to this invention, there is provided a solid state track detector composed of a crosslinked copolymer, said copolymer consisting essentially of (A) units derived from an alkylene glycol bisallyl carbonate represented by the general formula

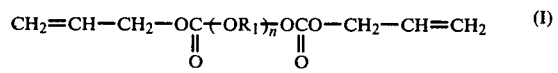

wherein $R_1$ represents an alkylene group having 2 to 6 carbon atoms, and n is an integer of from 1 to 6, and (B) units derived from an alkyl acrylate or methacrylate represented by the general formula

wherein $R_2$ represents a hydrogen atom or a methyl group and $R_2$ represents an unsubstituted or substituted alkyl group having 6 to 20 carbon atoms, the proportion of said units derived from the alkyl acrylate or methacrylate of formula (II) being 0.5 to 3 mole% based on the crosslinked copolymer.

It is very important that the crosslinked copolymer used as the solid state track detector of this invention should consist essentially of the units derived from the alkylene glycol bisallyl carbonate of formula (I) and the units derived from the alkyl acrylate or methacrylate of formula (II), and the proportion of the units derived from the monomer of formula (II) should be 0.5 to 3 mole% based on the crosslinked polymer. As will be stated hereinafter, the objects of this invention will not be achieved if the crosslinked copolymer lacks one or both of these two requirements.

The alkylene glycol bisallyl carbonate used in this invention is represented by general formula (I) given above. In general formula (I), $R_1$ is an alkylene group having 2 to 6 carbon atoms, and n is an integer of 1 to 6. Examples of the alkylene group having 2 to 6 carbon atoms include ethylene, 1,2-propylene, 1,3-propylene, 1,4-butylene, 1,5-pentylene and 1,6-hexylene. Alkylene groups having 2 to 4 carbon atoms are preferred as $R_1$, and n is preferably 1 or 2.

Examples of the alkylene glycol bisallyl carbonate include ethylene glycol bisallyl carbonate, 1,2-propylene glycol bisallyl carbonate, 1,3-propylene glycol bisallyl carbonate, diethylene glycol bisallyl carbonate, dipropylene glycol bisallyl carbonate, and dibutylene glycol bisallyl carbonate. Of these, ethylene glycol bisallyl carbonate, 1,2-propylene glycol bisallyl carbonate, 1,3-propylene glycol bisallyl carbonate, diethylene glycol bisallyl carbonate and dipropylene glycol bisallyl carbonate are especially preferred.

The alkyl acrylate or methacrylate used in this invention is defined by general formula (II) above. In general formula (II), $R_2$ is a hydrogen atom or a methyl group, and $R_3$ is an unsubstituted or substituted alkyl group having 6 to 20 carbon atoms. Examples of the unsubstituted alkyl group having 6 to 20 carbon atoms for $R_3$ are hexyl, heptyl, octyl, nonyl, decyl, undecyl, dodecyl, tridecyl, tetradecyl, pentadecyl, hexadecyl, heptadecyl, octadecyl, nonadecyl and eicosyl groups which may be linear or branched. These alkyl groups may be substituted. The substituent may be present to replace at least one hydrogen of the alkyl group. Preferred substituents include, for example, halogen atoms such as chlorine, bromine, iodine or fluorine, and lower alkoxy groups having 1 to 4 carbon atoms such as methoxy, ethoxy, propoxy and butoxy, and a phenoxy group.

Examples of preferred alkyl acrylates or methacrylates of general formula (II) are hexyl acrylate or methacrylate, 2-ethylhexyl acrylate or methacrylate, n-dodecyl acrylate or methacrylate and stearyl acrylate or methacrylate.

If the alkyl group for $R_3$ has less than 6 carbon atoms, the crosslinked copolymer drastically loses its transparency after chemical etching, and cannot achieve the objects of this invention. If the alkyl group has more than 20 carbon atoms, the compatibility of the alkyl acrylate or methacrylate with the alkylene glycol bisallyl carbonate is reduced, and they are difficult to mix uniformly in the production of the crosslinked copolymer. Consequently, the resulting crosslinked copolymer cannot have a smooth surface.

Especially preferred alkyl acrylates or methacrylates for use in this invention are those of general formula (II) in which $R_3$ is an unsubstituted or substituted alkyl group having 8 to 18 carbon atoms.

The crosslinked copolymer used in this invention should consist essentially of the units derived from the alkylene glycol bisallyl carbonate of general formula (I) and the units derived from the alkyl acrylate or methacrylate of general formula (II), the proportion of the units from the monomer of general formula (II) being 0.5 to 3 mole% based on the copolymer. If the proportion of the units derived from the acrylic monomer of general formula (II) is less than 0.5 mole%, chemical etching produces background holes on the surface of the crosslinked copolymer and gives a product of much reduced transparency. Such a product cannot be used as a solid state track detector. Furthermore, if the production of the units derived from the acrylic monomer of general formula (II) exceeds 3 mole%, the sensitivity of the crosslinked copolymer to the formation of etch pits by neutrons, charged particles, etc. is reduced.

It is very important as stated above that the acrylic monomer of formula (II) constituting the units of the crosslinked copolymer should have an unsubstituted or substituted alkyl group having 6 to 20 carbon atoms, and the crosslinked copolymer should contain 0.5 to 3 mole% of the units derived from this acrylic monomer. This will be more clearly understood from the specific data shown in the working examples hereinafter.

The crosslinked copolymer constituting the solid state track detector of this invention is provided usually in the form of a sheet and used as such as a solid state track detector.

In a broad sense, the crosslinked copolymer used in this invention is encompassed by the copolymer containing at least 50% by weight of an alkylene glycol diallyl carbonate, which is described in Japanese Patent Publication No. 31484/1984 as an outside layer resin of a jacket crown or a veneered crown for teeth. This Japanese patent document, however, does not specifically describe a crosslinked copolymer having the composition specified in the present invention, and fails to give even the slightest suggestion about a solid state track detector.

The crosslinked copolymer used in this invention can be produced by a method known per se.

A typical suitable method comprises introducing a mixed solution of the alkylene glycol bisallyl carbonate of general formula (I) and the alkyl acrylate or methacrylate of general formula (II) together with a radical polymerization initiator into a mold held by an elastomer gasket or spacer, and curing and polymerizing the monomeric mixture in an air oven. The crosslinked copolymer is withdrawn from the mold and obtained directly as a sheet. The polymerization is generally carried out preferably in two stages in which it is started slowly at relatively low temperature and curing is performed at high temperatures at the end of the polymerization. For example, the polymerization is carried out slowly at room temperature to about 70° C., and is completed at a high temperature of about 80° to 120° C. This procedure is preferred because no strain remains in the resulting sheet.

Alternatively, prior to mixing of the starting compounds, a part of the alkylene glycol bisallyl carbonate may be partially (for example, to an extent of about 5 to 20%) polymerized.

It is also possible to polymerize the monomeric mixture preliminarily in the presence of a polymerization initiator to increase the viscosity of the mixture, and then polymerizing it by casting.

The radical polymerization initiator is not particularly limited, and any known initiators can be used. For example, there can be used ordinary radical polymerization initiators such as diisopropyl peroxydicarbonate, azobisisobutyronitrile and benzoyl peroxide. The amount of the radical polymerization initiator varies according to the mode of polymerization, the polymerization conditions, the types of the monomers polymerized, etc., and cannot be definitely defined. Generally, it is preferably used in an amount of 0.01 to 10% by weight based on the total weight of the monomers.

As required, various additives such as mold releasing agents, ultraviolet absorbers, antioxidants, coloration inhibitors, antistatic agents, fluorescent bleaching agents and stabilizers may be added in performing the polymerization.

The units derived from the compounds of general formula (I) and (II) in the crosslinked copolymer constituting the SSTD of the invention can be determined by known methods, generally by FTIR spectrometry, $^{13}C$ NMR, techniques of combined pyrolysis-gas chromatography and mass spectrometry (P.G.M.), pyrolysis-gas chromatography, etc.

The sheet obtained by the polymerization may be used as such as SSTD, or the sheet may be mounted on a frame to use it as a badge.

For the measurement of charged particles, the above sheet can generally be used at a place where the charged particles exist. On the other hand, since neutrons have no electrical charge, latent images thereof cannot directly be formed clearly on the sheet. For the measurement of neutrons, therefore, the sheet surface is covered with a film or sheet capable of generating protons upon irradiation of neutrons on it and the sheet is placed so that its covered surface is irradiated with neutrons. The film or sheet used for covering may be formed of a polymeric material having a carbon-hydrogen bond, such as polyethylene, polypropylene, polyisobutylene, polyisoprene, polyvinyl methyl ether, polyacrylonitrile, polyethylene terephthalate, polyvinyl alcohol, polystyrene, polycaprolactone, and poly(meth-)acrylic methyl ether.

The thickness of the sheet used as the SSTD differs depending upon its use conditions and the environment in which it is used, and cannot be definitely defined. Generally, it is preferably in the range of 0.05 to 10 mm.

The SSTD of the invention sensitively forms latent images with respect to neutrons or charged particles. Since the latent images cannot be viewed directly, a technique is generally used preferably which comprises chemically etching the SSTD having the latent images formed thereon with, for example, an alkali such as sodium hydroxide or potassium hydroxide, and determining the etch pits developed on the surface of the etched sheet by means of a photomicrograph.

The SSTD of this invention permits very sensitive formation of latent images of neutrons or charged particles. The surface of the chemically etched sheet is smooth, and the etched pits formed by neutrons or charged particles are clearly marked. Furthermore, the chemically etched sheet scarcely loses its original transparency as will be shown later in Examples. Because of these excellent characteristics, the SSTD of the invention can almost completely overcome the defects of conventional solid state track detectors which have been desired to be eliminated.

The following Examples and Comparative Examples illustrate the present invention more specifically. It should be understood that the invention is not limited to these examples.

Preparation of test samples (sheets) and the measurement of transparency in these examples were performed in accordance with the following methods.

Preparation of a sheet

A sample sheet was prepared by cast polymerization. Two tempered glass sheets having a size of 200×200 mm and 9 mm in thickness were used, and a gasket having a cut for casting made of a silicone rubber with a thickness of 1.7 mm was interposed between the two glass sheets. The marginal portions of the glass sheets were fixed by binder clips to form a cell. The starting monomers were mixed, and the mixture was deaerated by a vacuum pump at 1 to 2 torr for 1 minute and filtered through a 0.45 micron filter (Toyo Membrane Filter, Type TM-2P).

The monomeric mixture was poured into the cell through its pouring port, and slowly polymerized in an air oven over 24 hours while the temperature was raised from 40° to 90° C. After the polymerization, the polymer was released from the mold, and post-cured at 100° C. for 1 hour to give a sheet having a thickness of 1.6 mm.

Transparency

A sample sheet was subjected to a spectrophotometer (Hitachi Model 323 Spectrophotometer) to measure the transmittance of light at 530 mm.

EXAMPLES 1-5 AND COMPARATIVE EXAMPLES 1-4

One hundred parts by weight of a composition composed of 98.75% by weight of diethylene glycol bisallyl carbonate (TS-16, a trade name for a product of Tokuyama Soda Co., Ltd.) and 1.25% by weight of each of the alkyl methacrylates indicated in Table 1 was mixed with 2.8 parts by weight of diisopropyl peroxydicarbonate as a polymerization initiator. The mixture was stirred for 1 hour, and formed in the sheet by the method described hereinabove.

A polyethylene sheet having a thickness of 0.9 mm was placed on the surface of the resulting sheet, and neutrons were irradiated from $^{252}Cf$ onto that surface of the sheet which was covered with the polyethylene sheet. The sheet was then immersed in a 5.2N aqueous solution of sodium hydroxide at 60° C. for 18 hours to etch it chemically. The number of etch pits per $cm^2$ on the sheet surface was calculated by its microphotograph (300 magnifications). The calculation of the etch pits was done with respect to those which could be clearly distinguished from background holes.

The transmittance of the sheet before and after the etching treatment was measured. The results are shown in Table 1. In Table 1, M/M+A (mole%) represents the proportion in mole% of the content of the alkyl methacrylate based on the composition composed of the alkylene glycol bisallyl carbonate (A) and the alkyl methacrylate (M).

TABLE 1

| Run (*) | Alkyl of the alkyl methacrylate | M/M + A (mole %) | Sensitivity (number of pits per cm²) | Transmittance (%) Before etching | After etching |
|---|---|---|---|---|---|
| C 1 | (Blank) | — | 4.5 × 10³ | 92 | 5.2 |
| C 2 | n-Ethyl | 2.95 | 4.5 × 10³ | 92 | 14.1 |
| C 3 | n-Butyl | 2.38 | 4.8 × 10³ | 92 | 55.4 |
| C 4 | iso-Butyl | 2.38 | 5.0 × 10³ | 92 | 56.9 |
| E 1 | n-Hexyl | 2.00 | 5.8 × 10³ | 92 | 69.2 |
| E 2 | 2-Ethyl-hexyl | 1.72 | 5.6 × 10³ | 92 | 75.9 |
| E 3 | Iso-Decyl | 1.51 | 6.1 × 10³ | 92 | 87.1 |
| E 4 | n-Dodecyl | 1.35 | 6.2 × 10³ | 92 | 90.4 |
| E 5 | Stearyl | 1.02 | 6.0 × 10³ | 92 | 90.3 |

(*)E stands for Example; C, Comparative Example.

EXAMPLES 6-8

The procedure of Example 1 was repeated except that each of the alkylene glycol bisallyl carbonates shown in Table 2 was used instead of the diethylene glycol bisallyl carbonate used in Example 1. The results are shown in Table 2. In Table 2, M/M+A (mole%) has the same significance as in Table 1.

TABLE 2

| Example | Alkylene glycol bisallyl carbonate | M/M + A (mole %) | Sensitivity (number of pits/cm²) | Transmittance (%) Before etching | After etching |
|---|---|---|---|---|---|
| 6 | Ethylene glycol bisallyl carbonate | 1.13 | 5.7 × 10³ | 91.8 | 89.2 |
| 7 | Propylene glycol bisallyl carbonate | 1.20 | 5.8 × 10³ | 91.7 | 89.4 |
| 8 | Dipropylene glycol bisallyl carbonate | 1.48 | 6.0 × 10³ | 91.5 | 89.9 |

EXAMPLES 9-13 AND COMPARATIVE EXAMPLE 5

The same procedure as in Example 4 was repeated except that the proportion of n-dodecyl methacrylate was changed as shown in Table 3. The results are shown in Table 3. In Table 3, M/M+A (mole%) has the same significance as in Table 1.

TABLE 3

| Run (*) | Amount of n-dodecyl methacrylate (wt. %) | M/M + A (mole %) | Sensitivity (number of pits cm²) | Transmittance (%) Before etching | Transmittance (%) After-etching |
| --- | --- | --- | --- | --- | --- |
| E 9 | 0.6 | 0.65 | 6.0 × 10³ | 92 | 75.7 |
| E 10 | 0.75 | 0.81 | 6.3 × 10³ | 92 | 88.6 |
| E 11 | 1.25 | 1.35 | 6.2 × 10³ | 92 | 90.4 |
| E 12 | 2.0 | 2.15 | 5.8 × 10³ | 92 | 83.1 |
| E 13 | 2.5 | 2.69 | 5.9 × 10³ | 92 | 70.3 |
| C 5 | 3.5 | 3.77 | 5.5 × 10³ | 92 | 59.7 |

(*)Same as the footnote to Table 1.

EXAMPLES 14 AND 15

The same procedure as in Example 1 was repeated except that each of the alkyl acrylates indicated in Table 4 was used instead of the alkyl methacrylate in Example 1. The results are shown in Table 4. M/M+A (mole%) in Table 4 represents the proportion in mole% of the alkyl acrylate based on the composition composed of the alkylene glycol bisallyl carbonate (A) and the alkyl acrylate (M).

TABLE 4

| Example | Alkyl acrylate | M/M + A (mole %) | Sensitivity (number of pits per cm²) | Transmittance (%) Before etching | Transmittance (%) After etching |
| --- | --- | --- | --- | --- | --- |
| 14 | n-Hexyl acrylate | 2.18 | 5.7 × 10³ | 92 | 67.6 |
| 15 | n-Dodecyl acrylate | 1.42 | 5.9 × 10³ | 92 | 90.2 |

What is claimed is:

1. A solid state track detector composed of a crosslinked copolymer, said copolymer consisting essentially of (A) units derived from an alkylene glycol bisallyl carbonate represented by the general formula

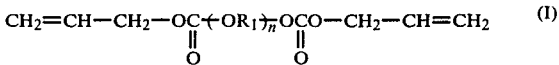

wherein $R_1$ represents an alkylene group having 2 to 6 carbon atoms, and n is an integer of from 1 to 6, and (B) units derived from an alkyl acrylate or methacrylate represented by the general formula

wherein $R_2$ represents a hydrogen atom or a methyl group and $R_3$ represents an unsubstituted or substituted alkyl group having 6 to 20 carbon atoms, the proportion of said units derived from the alkyl acrylate or methacrylate of formula (II) being 0.5 to 3 mole% based on the crosslinked copolymer.

2. The solid state track detector of claim 1 wherein $R_1$ in general formula (I) is an alkylene group having 2 to 4 carbon atoms.

3. The solid state track detector of claim 1 wherein n in general formula (I) is 1 or 2.

4. The solid state track detector of claim 1 wherein the alkylene glycol bisallyl carbonate in general formula (I) is selected from the group consisting of ethylene glycol bisallyl carbonate, 1,2-propylene glycol bisallyl carbonate, 1,3-propylene glycol bisallyl carbonate, diethylene glycol bisallyl carbonate, dipropylene glycol bisallyl carbonate and mixtures of these.

5. The solid state track detector of claim 1 wherein $R_3$ in general formula (II) is an unsubstituted or substituted alkyl group having 8 to 18 carbon atoms.

6. The solid state track detector of claim 5 wherein the substituent on the substituted alkyl group is selected from the class consisting of halogen atoms, alkoxy groups having 1 to 4 carbon atoms and a phenoxy group.

7. The solid state track detector of claim 1 or 5 wherein the units (B) are derived from said alkyl acrylate and wherein the alkyl acrylate of general formula (II) is hexyl acrylate, 2-ethylhexyl acrylate, n-dodecyl acrylate or stearyl acrylate.

8. The solid state track detector of claim 1 or 5 wherein the units (B) are derived from alkyl methacrylate and wherein the alkyl methacrylate of general formula (II) is hexyl methacrylate, 2-ethylhexyl methacrylate, n-dodecyl methacrylate or stearyl methacrylate.

* * * * *